United States Patent
Eleftheriou

(10) Patent No.: US 11,426,918 B2
(45) Date of Patent: Aug. 30, 2022

(54) MACHINE FOR MANUFACTURING PLASTIC ITEMS BY BLOW MOULDING

(71) Applicant: Stylianos Eleftheriou, Marly-le-Roi (FR)

(72) Inventor: Stylianos Eleftheriou, Marly-le-Roi (FR)

( * ) Notice: Subject to any disclaimer, the term of this patent is extended or adjusted under 35 U.S.C. 154(b) by 291 days.

(21) Appl. No.: 16/632,729

(22) PCT Filed: Jul. 20, 2018

(86) PCT No.: PCT/FR2018/051855
§ 371 (c)(1),
(2) Date: Jan. 21, 2020

(87) PCT Pub. No.: WO2019/016486
PCT Pub. Date: Jan. 24, 2019

(65) Prior Publication Data
US 2021/0146593 A1    May 20, 2021

(30) Foreign Application Priority Data
Jul. 21, 2017   (FR) ...................................... 1756965

(51) Int. Cl.
*B29C 49/02*    (2006.01)
*B29C 49/68*    (2006.01)
(Continued)

(52) U.S. Cl.
CPC .............. *B29C 49/02* (2013.01); *B29C 49/68* (2013.01); *B29C 49/78* (2013.01);
(Continued)

(58) Field of Classification Search
USPC ........................................................ 156/500
See application file for complete search history.

(56) References Cited

U.S. PATENT DOCUMENTS

| 4,790,741 A | 12/1988 | Takakusaki et al. |
| 2005/0170113 A1 | 8/2005 | Hill |

(Continued)

FOREIGN PATENT DOCUMENTS

| CN | 102712128 | 10/2012 |
| EP | 1334817 | 8/2003 |

(Continued)

OTHER PUBLICATIONS

Eleftheriou, Stylianos; International Search Report and Written Opinion for PCT/FR2018/051855, filed Jul. 20, 2018, dated Oct. 22, 2018 and English Translation(s).

*Primary Examiner* — James D Sells
(74) *Attorney, Agent, or Firm* — Taylor English Duma LLP

(57) ABSTRACT

The invention concerns a machine for manufacturing plastic items comprising, in series, along the manufacturing line: a rotatable roll (1) of plastic material in the form of at least one strip; a shaper (4) for forming tubes from said strips and means (5) for longitudinally welding said tubes; means (6) for cutting the tubes transversely, arranged so as to form tube sections (10); means for transferring and depositing said sections in holding and moving means; an oven (8) in which said tube sections move; a first turret (9) supporting moulds; means for processing the tube sections in the first turret; means for blowing a pressurised fluid into the moulds; a second turret (14) for discharging the bottles from said moulds.

14 Claims, 6 Drawing Sheets

(51) Int. Cl.
 *B29C 49/78* (2006.01)
 *B29K 23/00* (2006.01)
 *B29L 31/00* (2006.01)

(52) U.S. Cl.
 CPC .... *B29K 2023/065* (2013.01); *B29K 2023/12* (2013.01); *B29L 2031/7158* (2013.01)

(56) References Cited

U.S. PATENT DOCUMENTS

2007/0145646 A1   6/2007  Cho
2011/0303673 A1* 12/2011  Wilkes ................ B29C 49/0047
                                                  220/601
2015/0266228 A1   9/2015  Eleftheriou

FOREIGN PATENT DOCUMENTS

EP        1588835      10/2005
EP        2321113       5/2011

* cited by examiner

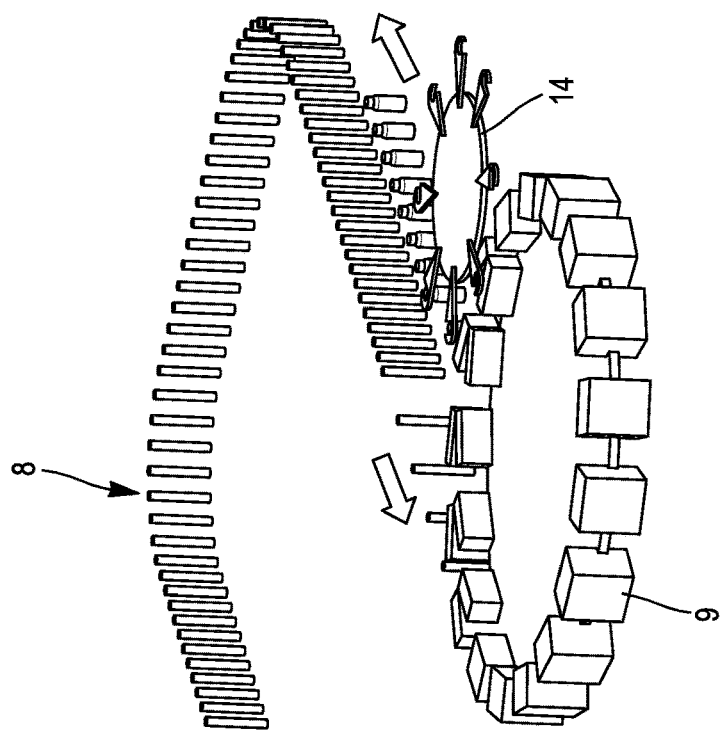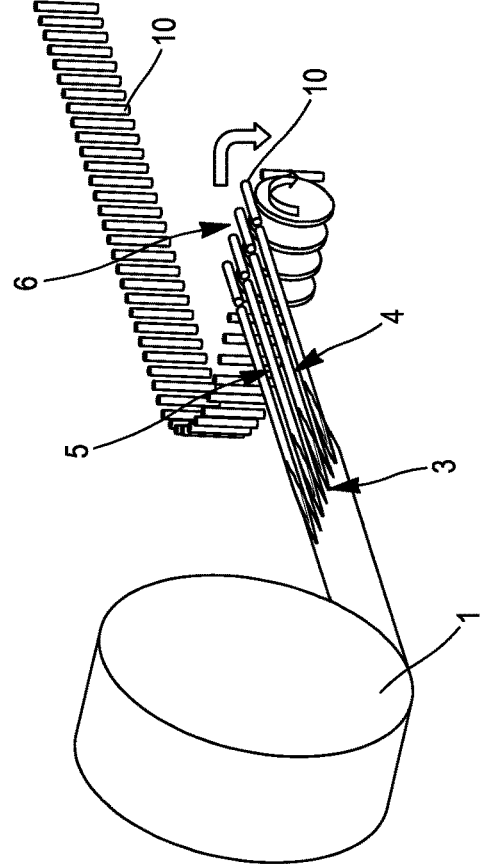
FIG. 1

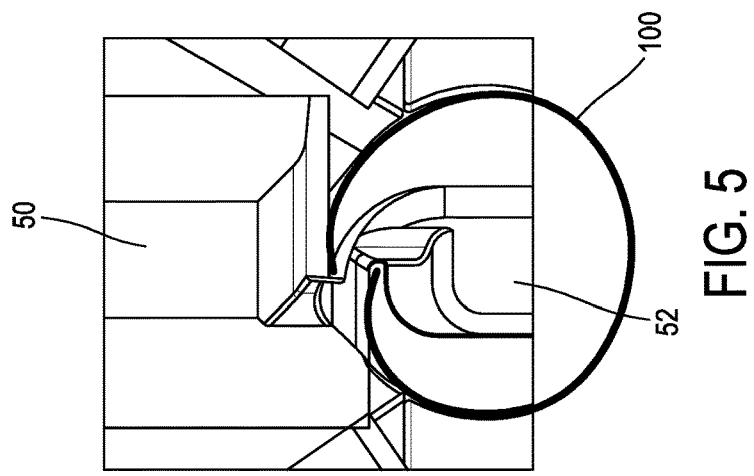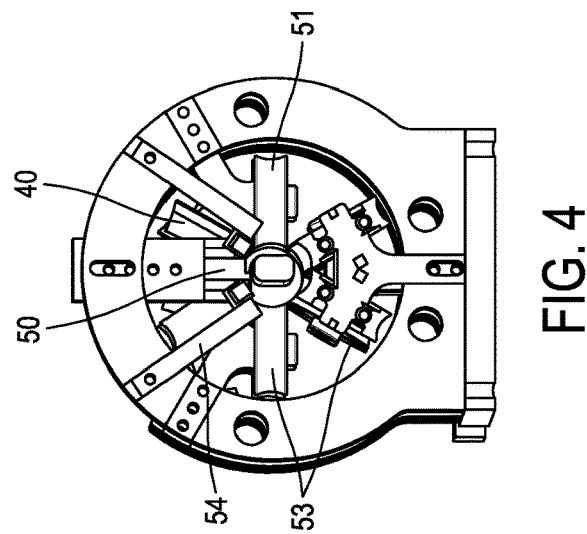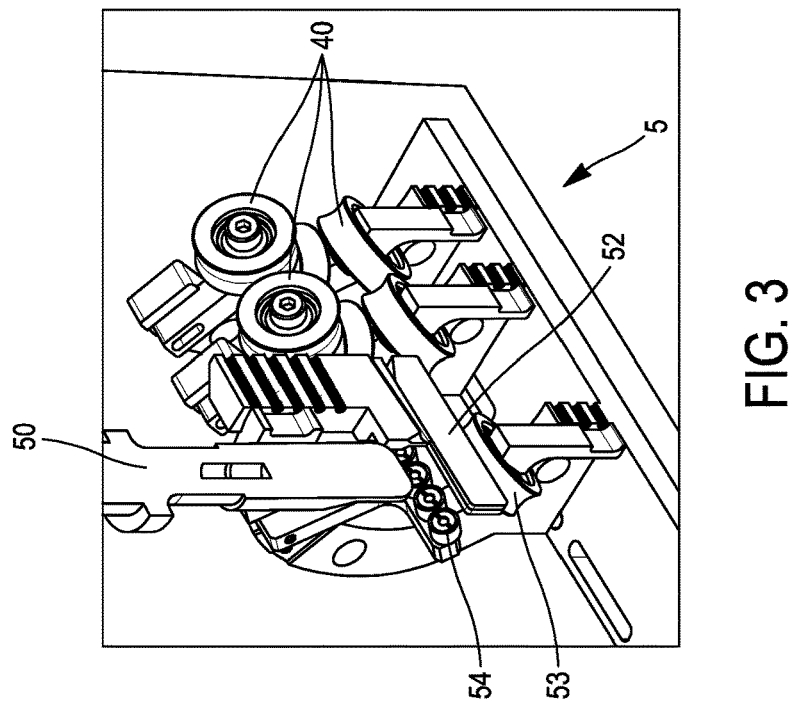

MACHINE FOR MANUFACTURING PLASTIC ITEMS BY BLOW MOULDING

TECHNICAL FIELD OF THE INVENTION

The invention relates to the field of packaging and more particularly the manufacture of bottles or other items by blow moulding from a sheet of semi-rigid plastic, i.e. which tends to recover its initial shape after deformation. Polypropylene or PEED or equivalent type materials are of particular relevance to the invention.

STATE OF THE ART

Described in document FR 2851227 is a device and method of blow moulding containers formed from a strip of thermoformable plastic. The method proposes to shape the strip into a tube, which is heated then inserted into a mold. Air injected into the tube enables it to be deformed by pressing the wall thereof against the inner surface of the mold cavity. On this principle, a machine is described in this earlier document; the machine disclosed in this document comprises a frame on which are mounted, successively along a rectilinear trajectory of the strip in the machine, a blow pin connected to air dispensing means and coaxial to a longitudinal direction of the strip, a shaper arranged around the blow pin in order to bring the longitudinal edges of the strip together to form the strip into a tube around the blow pin, means of welding the adjacent edges of the tube-shaped strip, at least one means of heating the strip, a mold having two parts movable relative to each other, and a device to drive the strip along the longitudinal direction thereof. The blowing means, the welding means, the heating means, the mold and the drive device are connected to a control unit arranged to control them in such a way as to implement the blow moulding method.

Moreover, numerous other machines based on the same principle are known.

For example, document FR 3018723 describes a machine capable of manufacturing plastic items by blow moulding from a sheet of semi-rigid plastic. This machine is called "cyclical" in-line and it comprises at least one guide rod associated with a shaper to form tubes from strips, means of welding the edges of the items, heating means, means of blow moulding the tubes in the molds.

Also known is document FR 2933958 that specifies cylinder-shaping means provided with two characteristic movable jaws arranged around a pin; one of the jaws has a slot with welding means placed facing it.

It is obvious that the prior art, although enabling plastic bottles to be manufactured free of defects, has limitations in terms of throughput and reliability. Furthermore, this technology does not allow easy management of thicknesses of plastic sheets that can produce packaging with a volume of greater than 500 ml or the like. The technical characteristics of such installations make their cost significant.

BRIEF DESCRIPTION OF THE INVENTION

The invention intends to remedy the disadvantages of the prior art and particularly to propose a machine for manufacturing plastic items by blow moulding, comprising successively along the manufacturing path: a roll of plastic material in the form of at least one strip and means of driving said role in rotation; at least one shaper capable of forming tubes from said strip.

To do this, according to a first aspect of the invention a machine is proposed which further comprises means of longitudinal welding of said tubes, fixed relative to the movable tubes; means of transverse cutting of the tubes, arranged so as to form sections of tubes or preforms; means of holding and moving tube the sections perpendicular to the longitudinal axis thereof; at least one oven in which said tube sections (preforms) are moved in the vertical position along a horizontal trajectory; a first support turret for molds the rotational speed whereof is synchronized by a control unit with the speed of the tube sections exiting from the oven in order to place said sections in the molds; means of processing the tube sections (preforms) at the first turret; means of blowing a pressurized fluid into the molds in order to give a definitive shape to the preforms, i.e. to form bottles; a second turret the speed whereof is synchronized with the speed of said first turret and arranged so as to evacuate the bottles from said molds, said synchronization being effected by the control unit.

Described here is a machine in which the plastic continuously travels in front of a fixed welding station after having been shaped and before being cut into sections, upstream from an oven which is generally horizontal and therefore of easy access, particularly for maintenance. Many advantages particularly as concerns ergonomics are mediated by these characteristic elements, as will be detailed hereinafter. The operation by continuous travel of the products to be manufactured makes it possible to limit wear and mechanical breakdowns, as well as to be free of vibration problems and to work at high throughputs.

According to the invention, the machine further comprises means, situated between the roll and the shaper, for cutting the plastic material into longitudinal strips.

According to the invention, said welding means comprises at least one sonotrode arranged so as to perform continuous welding by longitudinal welds of said tubes, said sonotrode cooperates with an anvil and means of constraining the plastic sheet. More specifically, said anvil has a profile arranged so as to concentrate the welding energy along a line.

In other words, the plastic continuously travels in front of the welding station which is fixed (principle of seaming in a sewing machine). The welding speed is high, higher than in the machines of the prior art in which the sonotrode (capable of welding) must be raised with each transfer of plastic. Additionally, a smaller number of welding heads is required; thus, the number of adjustments of position of welding heads is reduced.

Furthermore, the shaper comprises forming means placed upstream from the welding means, such as wheels.

The positioning of the plastic in the tubular shaper is better controlled. The plastic being guided directly towards the welding position thereof abutted on the two lateral edges thereof. The shaper according to the invention does not open and close with each cycle since it is the plastic material that slides to the welding position. The reliability of the positioning of the plastic overlap is improved, and therefore that of the weld itself.

Favorably, said means of holding the tube sections in the oven further enable the rotation of said sections around the longitudinal axes thereof when said sections are circulating in said oven. This ensures a homogeneity of heating of said sections over their entire profile. In addition, since the sections have a height substantially equal to the final height of the bottle and are individually held at the top and bottom, the risks of sagging and/or twisting and/or deformation in the oven are minimized.

Advantageously but optionally, said oven comprises means such as radiant heat lamps arranged in proximity to the trajectory of said sections. Favorably, mirrors can be added facing the heat lamps which further reduces the energy consumption of the oven, all things otherwise being equal.

Furthermore, the control unit enables a synchronization between the speed of rotation of said first turret and the speed of travel of the means for holding the tube sections in said oven.

Moreover, the means of processing said preforms in the first turret comprise means for opening and closing said mold, in a manner synchronized with the blowing of said fluid into said preforms placed in the mold.

Preferentially but optionally, the plastic in the oven is heated to an average temperature of about 150° C.

According to one embodiment of the invention, the shuttles cooperate with preform holding means at two points in proximity to their longitudinal ends.

According to another embodiment, the means of processing said preforms in the first turret further comprise means of positioning a neck gauge at one longitudinal end of said preforms placed in said mold, synchronized with the blowing of said fluid into said preforms. Optionally, the machine comprises means of thermoregulation specific to the neck gauge.

BRIEF DESCRIPTION OF THE FIGURES

Other characteristics and advantages of the invention will be seen by reading the following description, with reference to the appended figures in which:

FIG. 1 is a general diagram of the main functional stations implemented according to a first embodiment of the invention;

FIG. 3 is a view in perspective of the welding station;

FIG. 4 is a front view of the welding station;

FIG. 5 is a detailed diagram of the welding means;

For greater clarity, identical or similar elements are identified by identical reference signs in all the figures.

DETAILED DESCRIPTION OF ONE EMBODIMENT

Figure 2:
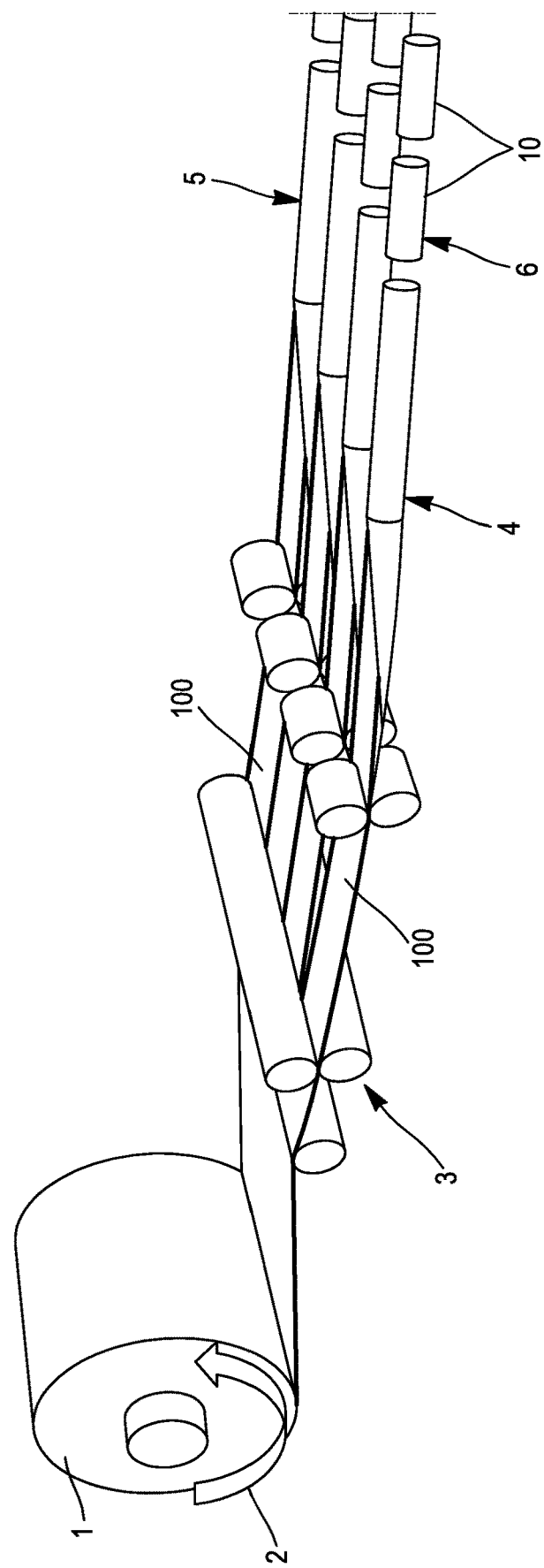
FIG. 2 is a diagram of the stations for longitudinal cutting, welding and cutting into sections.
Figure 8:
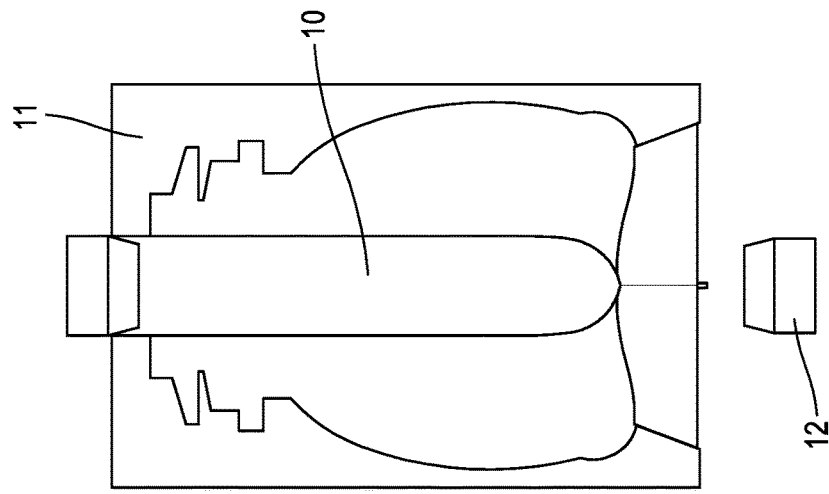
FIGS. 6 to 11 are the principal steps carried out by the machine according to the invention.
Figure 7:
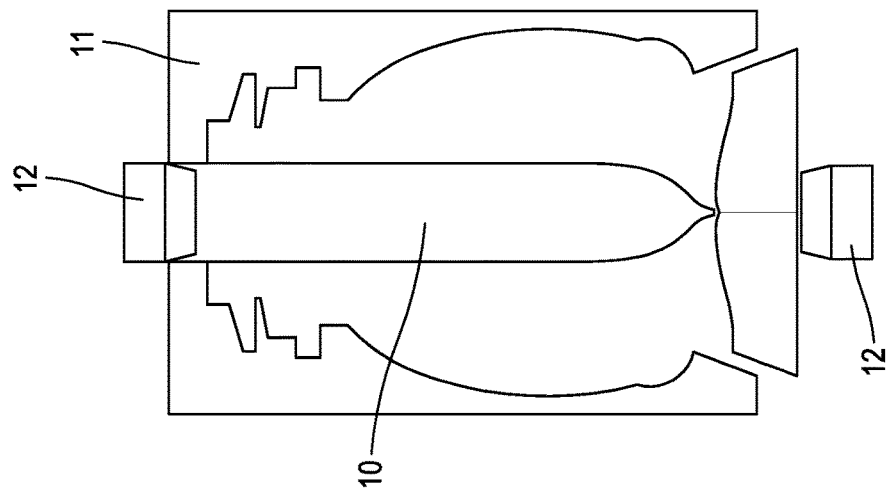
Figure 6:
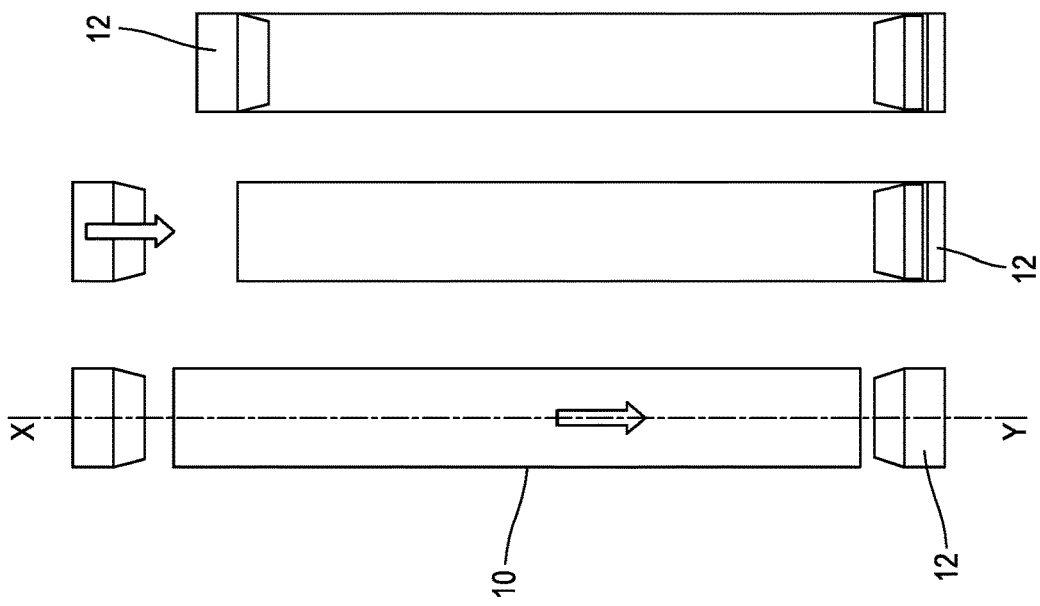

In a manner known per se, a roll 1 of plastic sheet material represents the supply of raw material; said roll is motorized so as to create a rotation around the main axis thereof. The arrow 2 in FIG. 2 symbolizes the drive in rotation. In a manner also known, means 3 of longitudinal cutting, i.e. along the length of the plastic sheet, are provided just downstream from the roll 1. The means 3 are visible in FIG. 2, depicted as two cylinders. Any known means can be chosen here. The strips 100 of plastic material thus formed are then held and moved towards at least one shaper 4 in order to form tubes from said strips. The width of each strip 100 corresponds to the perimeter of the tube to be manufactured.

As a variant of embodiment, the roll 1 of plastic material comprises a single strip the width whereof corresponds to the perimeter of the tube to be manufactured. In another variant of embodiment, the roll 1 of plastic material comprises two or more adjacent strips, the width of each of the adjacent strips corresponding to the perimeter of the tube to be manufactured. In these two variants, the strip(s) being precut to the proper width, the longitudinal cutting means 3 are no longer necessary.

In an innovative manner, the or each strip 100 is then continuously welded longitudinally by appropriate welding means 5; preferably, an ultrasound-based technology, such as a sonotrode, is used to perform said continuous welding.

FIGS. 3 to 5 illustrate a welding station according to the invention. More precisely, FIG. 3 shows that the shaping and welding station (also called welding means in this text) comprise in particular fixed wheels 40 for forming, which maintain each strip 100 in tube shape while allowing a translation along the longitudinal axis of the formed tube. A suitable number of wheels is chosen to enclose the strip and give it its final or near-final shape. Downstream from the forming wheels 40, a sonotrode 50 or any technically equivalent means is provided, constituting the vibrating part of the ultrasound module. The vibration creates a heating of the plastic by friction between the two lateral edges of the strip 100. FIG. 5 better shows the positioning of the semi-rigid strip 100 and in particular it can be seen that the two lateral edges thereof are laterally in abutment in order to perfectly control the overlap width of one edge over the other just upstream from the weld. The two edges positioned one over the other then slide onto a part called the anvil 52, which is a fixed and rigid counterpart. The positioning of the lateral edges of the strip is well-controlled here. This makes it possible to use profiles of anvil 52 suitable for concentrating the welding energy on a line and positioned relative to the overlap of the two edges of the strip. It will be understood that the profile of the anvil 52 is selected and calculated with care. Furthermore, wheels 53 for constraining the plastic 100 against the stop of the anvil 52 are also provided at and beneath the sonotrode 50. Rollers 54 are placed above the anvil 52 in order to reinforce the positioning of the strip at that level, namely in the immediate proximity of the sonotrode 50. When stopped, the sonotrode 50 is raised in order to allow the positioning of the strip 100; of course in the welding phase, the sonotrode 50 is applied against the plastic overlap of the two lateral edges of the strip 100 under constant pressure, in order to melt the plastic at that level and achieve the weld. Thus, the plastic is continuously formed then welded as close as possible with a short sonotrode. The weld obtained is perfectly homogeneous over the length thereof because the edge-to-edge overlap is constant and controlled during the welding.

Such a continuous weld makes it possible to avoid the weld overlap from one step to another. In a known manner, in so-called cyclical operation, in order to ensure a good-quality continuous weld line a weld overlap zone is required between each step. The overlap zone of the weld is a zone of mechanical fragility. This known technique poses problems because, since bottles have different heights, the sonotrode must be sized for the largest bottle format so that the overlap zone can be large if the difference in height between the smallest and largest bottle to be manufactured is large. The present invention avoids this problem by the continuous longitudinal weld. Furthermore, the welding speed can be greater than in the known prior art. To illustrate this, the welding speed according to the invention is of the order of 300 to 500 mm per second, while said speed of the known method is less than 100 mm per second.

The number of welding heads is reduced compared to the prior art, all else otherwise being equal. Thus, to manufacture 20,000 bottles per hour, the invention provides three or four welding heads, depending in particular on the size of the bottles and the thickness of the plastic; the prior art requires 14 of them. In other words, the number of welding heads is divided by 3 or 4, which represents a sure savings since the welding heads represent the most expensive equipment of the installation. Furthermore, welding heads of small size and generators of lower power are chosen, and are thus less expensive. By way of illustration, 20 kHz sonotrode heads marketed under the brands Branson, Hermann or Dukane provided with generators of less than 1000 W can be used even at high throughputs.

This simplification related to the reduced number of welding heads also reduces the adjustment of the position of the heads. Moreover, material losses at startup are low. It is noted again that the welding heads are fixed; it is the plastic material which is in forward motion, and which is easily positioned in a way that is controlled, preferably beneath the welding heads. Welding reliability is thus achieved according to the invention. Moreover, the continuous forward motion results in welding precision by the precision of the positioning; here, it is easy to implement an energy director in order to optimize the ultrasound welding. The energy director is a profile on the welding anvil which allows the ultrasounds to be concentrated on a line.

Downstream from the tube formation station, relative to the direction of travel of the plastic material in the manufacturing machine according to the invention, means 6 are provided for transverse cutting of the tubes capable of forming tube sections 10. Such cutting is known per se.

According to the invention, each section 10, also called preform in the remainder of this text, is held vertically and transported on specific means called shuttles. In particular, the preform 10 turns around the longitudinal axis thereof, which is vertical. The preforms exiting from the various cutting stations are grouped and aligned along a conveyor line as shown in FIG. 1.

Favorably, the preforms 10 are transported in the shuttles towards and through an oven 8 in which they are moved by any known means, that will therefore not be described in detail. A single oven 8 is necessary here, contrary to the known prior art that requires one oven per track. In the oven 8, the preforms 10 are heated preferably by radiant heat lamps (not shown in the figures) arranged in proximity to the trajectory of the preforms. Furthermore, mirrors can be placed facing the lamps in order to improve the heating by reduction of the number of lamps and thus consumption of electricity. As an illustration, the average temperature of the plastic in the oven 8 is about 150° C. Moreover, the oven 8 which has a generally horizontal volume, is thus easily accessible.

The preforms 10 leave the shuttle only when they are taken up in the next step by a mold 11.

At the outlet of the oven 8, the shuttles supporting the preforms 10 allow them to be transferred, through synchronization with a first turret 9 or carousel, one by one into molds 11 placed on the first turret 9 which is in rotation around its principal vertical axis. More precisely, the shuttles are transferred into the molds at the moment each mold 11 passes through the shuttle. The shuttle is synchronized with the first turret 9 at the moment the mold 11 is closed. A control unit enables said synchronization. FIGS. 6 to 11 illustrate the processing of the preforms 10 until the placement thereof in the mold 11, prior to the blow moulding step. In fact, the shuttles are composed of end caps 12 mounted at each end of a preform 10, which while supporting the preforms 10, cause them to turn around their longitudinal axis XY. Any means known per se capable of said support and said rotation will be chosen appropriately by a person skilled in the art; such means will therefore not be further described. By way of illustration, the control and synchronization of the shuttles can be achieved by an endless screw synchronized with the first turret 9.

The number of molds of the carousel 9 is theoretically independent of the number of welding heads 5; however, about four to five molds are provided for one welding head 5, or sixteen to twenty molds for four welding heads.

The characteristic configuration of the invention makes it possible to properly control the position of the weld of the preform 10 in the mold 11. Thus, it is possible to precisely orient the position of the preform 10 at the moment the mold 11 is closed, and thus to position the weld at a precise location on the final bottle. This is particularly useful for oval bottles in order to avoid the weld being in the middle of the principal faces.

At the outlet of the oven 8, the preform 10 is hot and enclosed in a mold 11 preferably in two parts (which is opened along a vertical median plane). FIGS. 7 to 11 illustrate this step.

Figure 11:
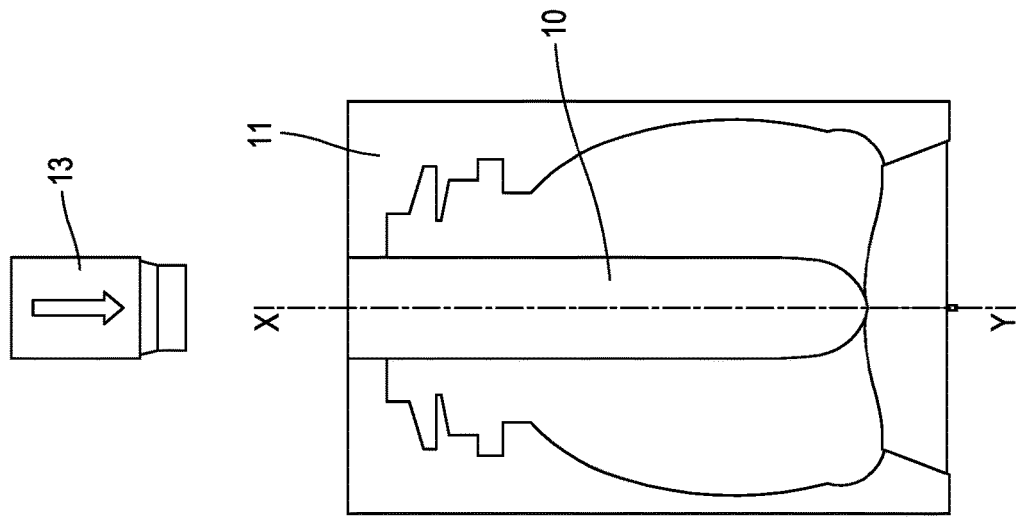
Figure 10:
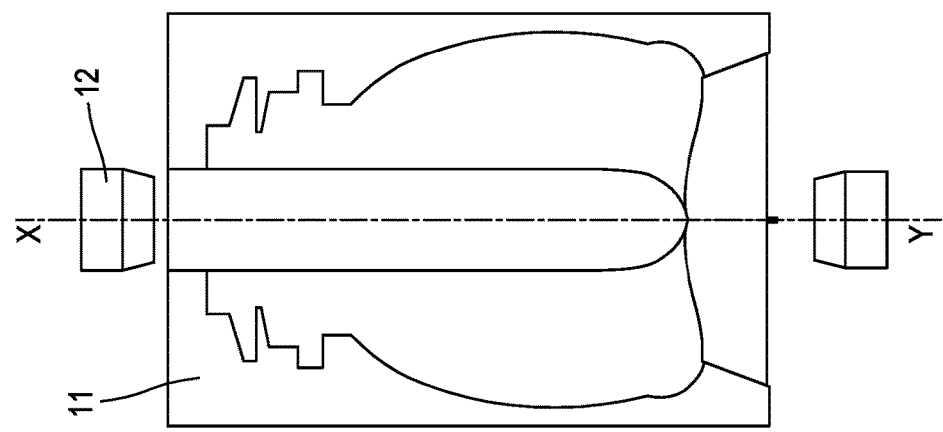
Figure 9:
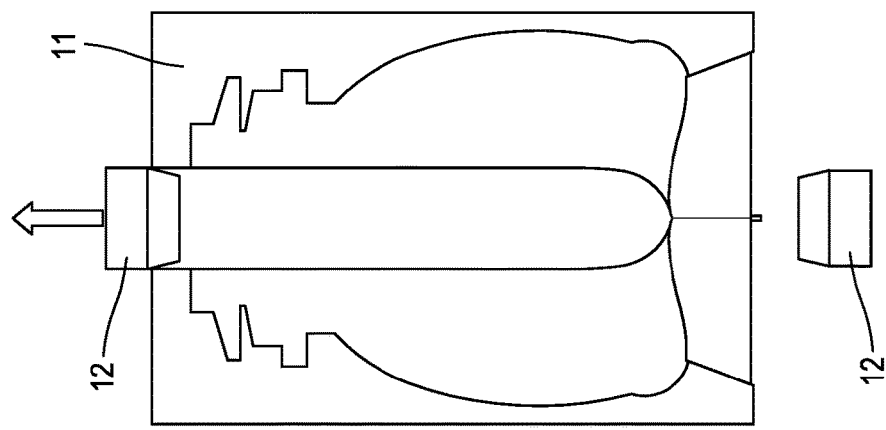

As shown in FIG. 11, a blow nozzle 13 is placed at the upper part of the mold 11, after the closing thereof. The sealing at the upper part of the mold 11 is achieved between said blow nozzle 13 and the mold 11 by the plastic sheet interposed between said two members. Once the mold is closed and the nozzle placed at the top, the nozzle 13 blows in pressurized air which pushes the plastic against the cold inner wall of the mold 11. Upon contact with the inner wall of the mold 11, the plastic hardens, taking the desired shape. A bottle is thus formed and is then directed towards a second turret 14, the rotation whereof is synchronized with the rotation of the first turret 9. This technology, called rotary blow moulding, enables the blow moulding step to be dissociated from the welding step. It is thus possible to have a large number of molds, increasing the welding speed irrespective of the duration of blow moulding. High throughputs are therefore possible, for example of the order of 20,000 to 30,000 bottles per hour.

Figure 12:
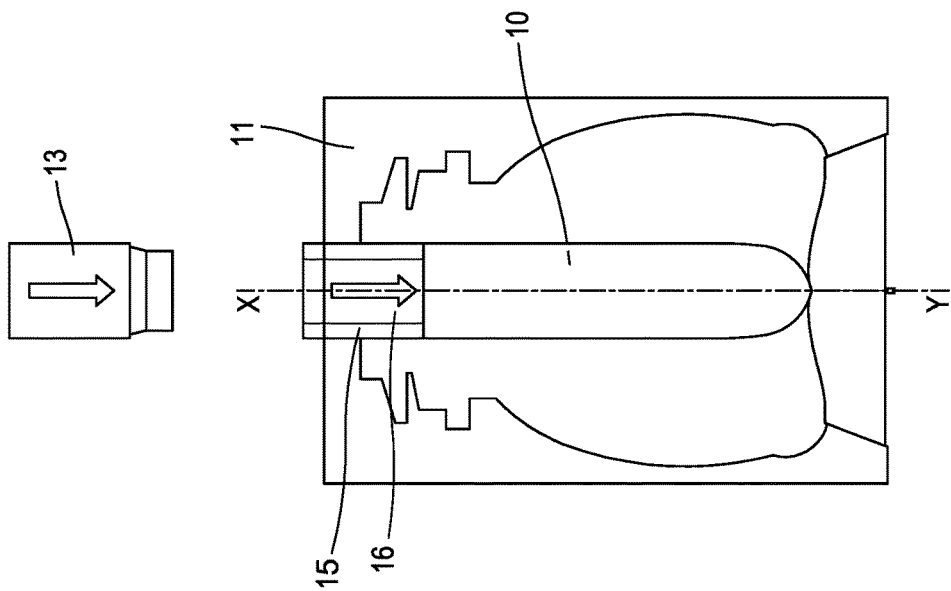
FIG. 12 is a step of installing a neck gauge used by the machine according to the invention.

According to a variant of embodiment illustrated in FIG. 12, prior to the placement of the blow nozzle 13, a neck gauge 15 is positioned in the upper part of the mold 11 at an upper end (in the figure) of the preform 10. The placement of the neck gauge 15 is performed when the mold 11 is closed. The blow nozzle 13 is then positioned as previously described. The neck gauge 15 comprises, coaxially, a conduit 16 through which the air is blown by the blow nozzle 13. According to a variant of embodiment, a tip of the blow nozzle 13 has a shape complementary to a shape of the upper end of the neck gauge 15 so that, once the blow nozzle 13 is in place, a seal is ensured between the latter and the neck gauge 15. Furthermore, such an arrangement of the neck gauge 15 allows the neck of the bottle thus formed to be cut, with the neck gauge 15 in place.

Optionally, the machine according to the invention comprises means of thermoregulation specific to the neck gauge 15. This enables a temperature of the neck gauge 15 to be set autonomously and independently so as to optimize the forming of the bottle at the neck thereof.

Figure 13:
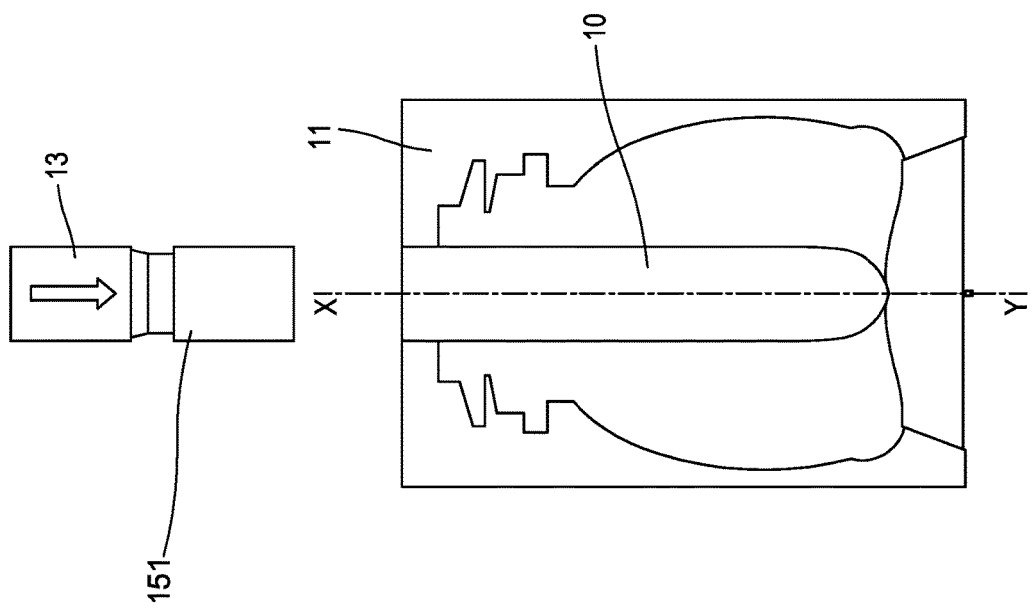
FIG. 13 is a variant of the step of FIG. 12.

As a variant of embodiment illustrated in FIG. 13, the neck gauge 151 is mounted integrally with the blow nozzle 13. Here, the blow nozzle 13 and the neck gauge 151 are put in place in a single operation, once the mold 11 is closed. As a variant, the neck gauge 151 and the blow nozzle 13 are one-piece of the same material.

Moreover, the blow moulding control means, such as a solenoid valve, can be placed as close as possible to the mold 11; the duration of blowing is short, of the order of two to three seconds; the flow rate of blowing is high; pressure losses are low; the duration of evacuation of the overpressure in the bottle after blowing is short, of the order of 0.2 seconds. Furthermore, rotary blow moulding enables large thicknesses of the order of 1 to 1.5 mm to be processed without having to reduce the speed of the machine; the equivalent prior art processes thicknesses of the order of 0.8 to 1 mm.

At the second turret 14, each bottle is extracted from its mold 11.

From the foregoing it can be seen that the machine according to the invention makes it possible to limit wear and breakdowns, avoid vibration problems, and obtain high throughputs of the order for example of 20,000 to 30,000 bottles per hour, with very advantageous reliability and ease of manufacturing.

The invention claimed is:

1. A machine for manufacturing plastic items by blow moulding, the blow moulding machine comprising successively along the manufacturing path:
   a roll of plastic material in the form of at least one strip;
   means for driving said roll in rotation;
   at least one shaper for forming tubes from said strip;
   means for longitudinal welding of said tubes, the longitudinal welding means fixed relative to the movable tubes;
   means for transverse cutting of the tubes, the transverse cutting means arranged so as to form sections of tubes or preforms;
   means for holding and moving the tube sections perpendicular to the longitudinal axis thereof;
   at least one oven wherein said tube sections (preforms) are moved in the oven in a vertical position along a horizontal trajectory;
   a first support turret for molds, wherein the first support turret is rotating at a speed synchronized by a control unit with the speed of the tube sections exiting from the oven in order to place said tube sections in the molds;
   means for processing the tube sections (preforms) at the first turret;
   means for blowing a pressurized fluid into the molds in order to give a definitive shape to the preforms;
   a second turret, wherein the speed of the second turret is synchronized by the control unit with the speed of said first turret and arranged so as to evacuate the shaped preforms from said molds.

2. The blow moulding machine as claimed in claim 1, further comprising means, for cutting the plastic material into longitudinal strips, the cutting means situated between the roll and the shaper.

3. The blow moulding machine as claimed in claim 1, further comprising an anvil, and means for constraining the strip, wherein said welding means comprises at least one sonotrode cooperating with the anvil and the strip constraining means and arranged so as to perform continuous welding by longitudinal welds of said tubes.

4. The blow moulding machine as claimed in claim 3, wherein said anvil has a profile arranged so as to concentrate the welding energy along a line.

5. The blow moulding machine as claimed in claim 1, wherein said shaper comprises forming means placed upstream from the welding means, the forming means comprising wheels.

6. The blow moulding machine as claimed in claim 1, wherein said means of holding the tube sections in said oven further enable the rotation of said sections around the longitudinal axes of the tube sections when said tube sections are circulating in said oven.

7. The blow moulding machine as claimed in claim 1, wherein said oven comprises radiant heat lamps arranged in proximity to the trajectory of said tube sections.

8. The blow moulding machine as claimed in claim 1, wherein the control unit enables a synchronization between the speed of rotation of said first turret and the speed of travel of the means for holding the tube sections in said oven.

9. The machine as claimed in claim 1, wherein the means for processing said preforms in the first turret comprises means for opening and closing said mold, in a manner synchronized with the blowing of said fluid into said preforms placed in said mold.

10. The blow moulding machine as claimed in claim 1, wherein the plastic in the oven is heated to an average temperature of about 150° C.

11. The blow moulding machine as claimed in claim 1, further comprising shuttles cooperating with preform holding means at two points in proximity to their longitudinal ends.

12. The blow moulding machine as claimed in claim 1, wherein the means for processing said preforms in the first turret further comprises means for positioning a neck gauge at one longitudinal end of said preforms placed in said mold (11), the neck gauge positioning means synchronized with the blowing of said fluid into said preforms.

13. The blow moulding machine as claimed in claim 12, further comprising means for thermoregulation specific to the neck gauge.

14. The blow moulding machine as claimed in claim 1, wherein the shape of the preforms is a bottle shape.

* * * * *